US012567667B2

(12) United States Patent

Yao et al.

(10) Patent No.: US 12,567,667 B2
(45) Date of Patent: Mar. 3, 2026

(54) ANTENNA STRUCTURE

(71) Applicant: Wistron NeWeb Corp., Hsinchu (TW)

(72) Inventors: De-Shao Yao, Hsinchu (TW); Chih-Feng Tai, Hsinchu (TW); Kuan-Hsun Lai, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 420 days.

(21) Appl. No.: 18/480,648

(22) Filed: Oct. 4, 2023

(65) Prior Publication Data

US 2024/0145918 A1 May 2, 2024

(30) Foreign Application Priority Data

Oct. 26, 2022 (TW) ................................ 111140540

(51) Int. Cl.
*H01Q 5/378* (2015.01)
*H01Q 1/48* (2006.01)
*H01Q 9/04* (2006.01)

(52) U.S. Cl.
CPC ............... *H01Q 5/378* (2015.01); *H01Q 1/48* (2013.01); *H01Q 9/0421* (2013.01)

(58) Field of Classification Search
CPC ......... H01Q 5/378; H01Q 1/48; H01Q 9/0421
See application file for complete search history.

(56) References Cited

U.S. PATENT DOCUMENTS

2017/0005414 A1 1/2017 Yang
2020/0274231 A1* 8/2020 Wei ........................ H01Q 5/364

FOREIGN PATENT DOCUMENTS

TW 201703350 A 1/2017
TW I646730 B 1/2019

* cited by examiner

*Primary Examiner* — Henry Luong
(74) *Attorney, Agent, or Firm* — McClure, Qualey & Rodack, LLP

(57) ABSTRACT

An antenna structure includes a metal mechanism element, a ground element, a feeding radiation element, a connection radiation element, a shorting radiation element, a parasitic radiation element, and a dielectric substrate. The metal mechanism element has a slot. The feeding radiation element has a feeding point. The connection radiation element is coupled to the feeding radiation element. The connection radiation element is further coupled through the shorting radiation element to the ground element. The parasitic radiation element is coupled to the ground element. The parasitic radiation element is disposed between the feeding radiation element and the shorting radiation element. The dielectric substrate is adjacent to the slot of the metal mechanism element. The feeding radiation element, the connection radiation element, the shorting radiation element, and the parasitic radiation element are all disposed on the dielectric substrate.

20 Claims, 5 Drawing Sheets

ANTENNA STRUCTURE

CROSS REFERENCE TO RELATED APPLICATIONS

This application claims priority of Taiwan Patent Application No. 111140540 filed on Oct. 26, 2022, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient bandwidth, it will negatively affect the communication quality of the mobile device in which it is installed. Accordingly, it has become a critical challenge for antenna designers to design a small-size, wideband antenna element.

BRIEF SUMMARY OF THE INVENTION

In an exemplary embodiment, the invention is directed to an antenna structure that includes a metal mechanism element, a ground element, a feeding radiation element, a connection radiation element, a shorting radiation element, a parasitic radiation element, and a dielectric substrate. The metal mechanism element has a slot. The feeding radiation element has a feeding point. The connection radiation element is coupled to the feeding radiation element. The connection radiation element is further coupled through the shorting radiation element to the ground element. The parasitic radiation element is coupled to the ground element. The parasitic radiation element is disposed between the feeding radiation element and the shorting radiation element. The dielectric substrate is adjacent to the slot of the metal mechanism element. The feeding radiation element, the connection radiation element, the shorting radiation element, and the parasitic radiation element are all disposed on the dielectric substrate.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
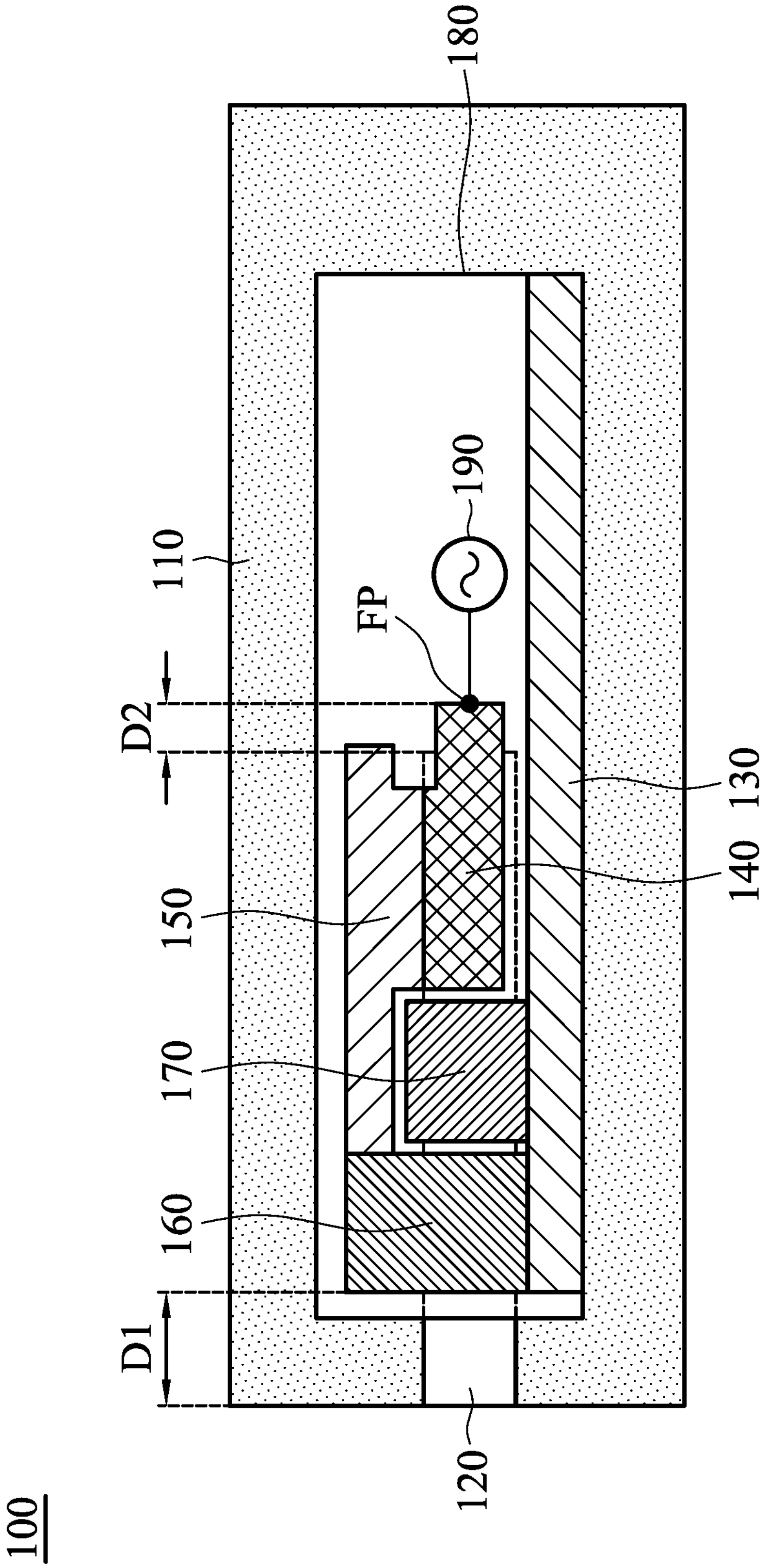
FIG. 1 is a see-through view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
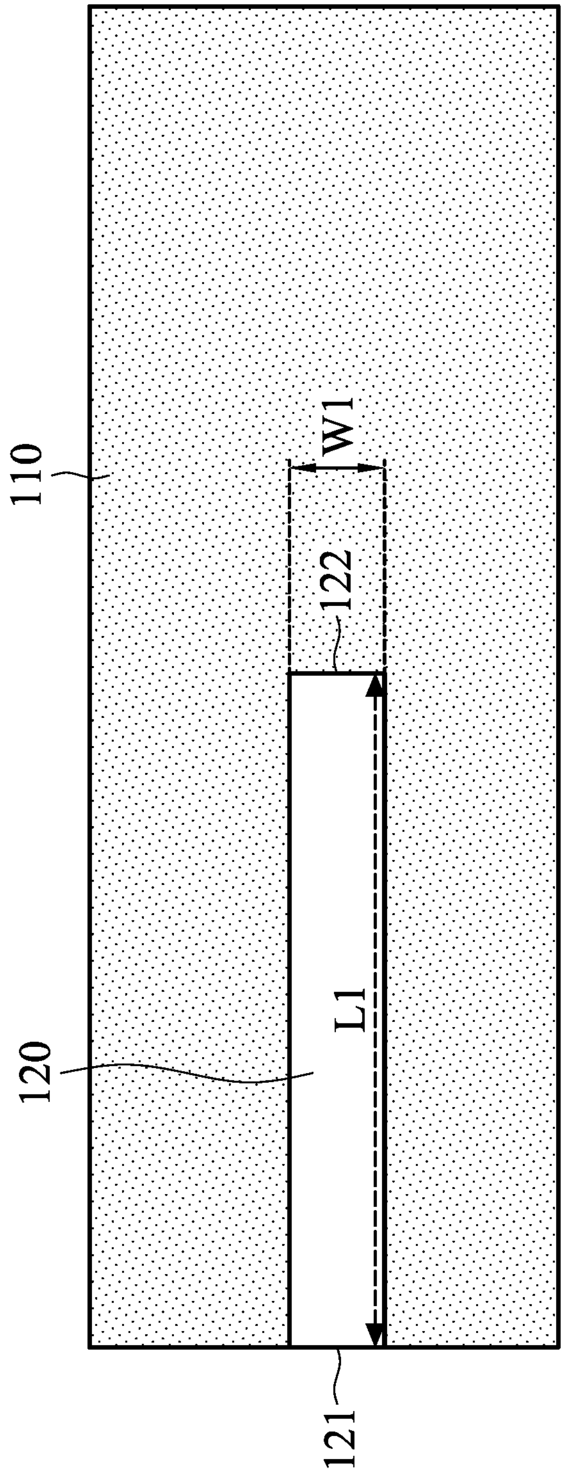
FIG. 2 is a partial view of a lower layer of an antenna structure according to an embodiment of the invention.
Figure 3:
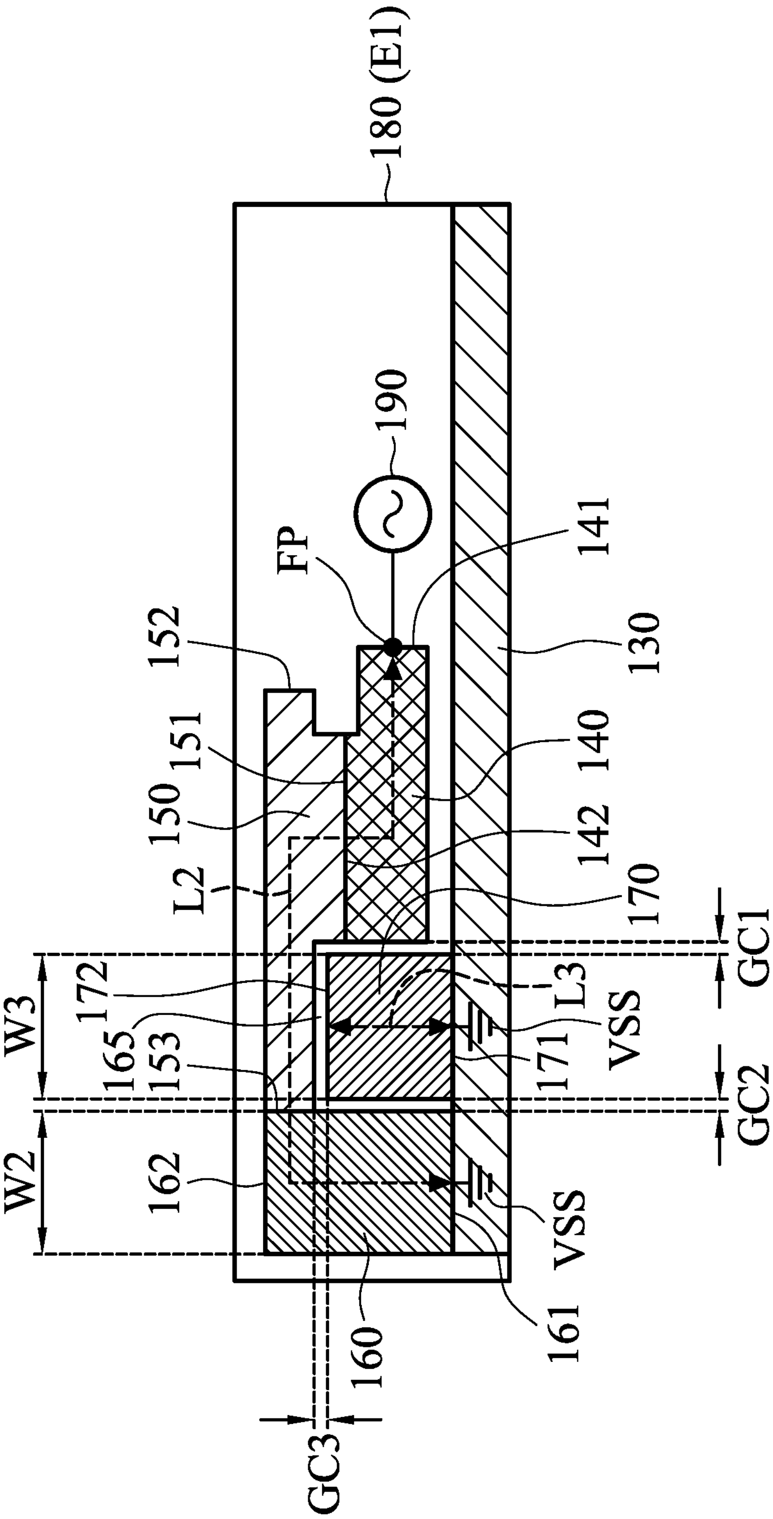
FIG. 3 is a partial view of an upper layer of an antenna structure according to an embodiment of the invention.
Figure 4:
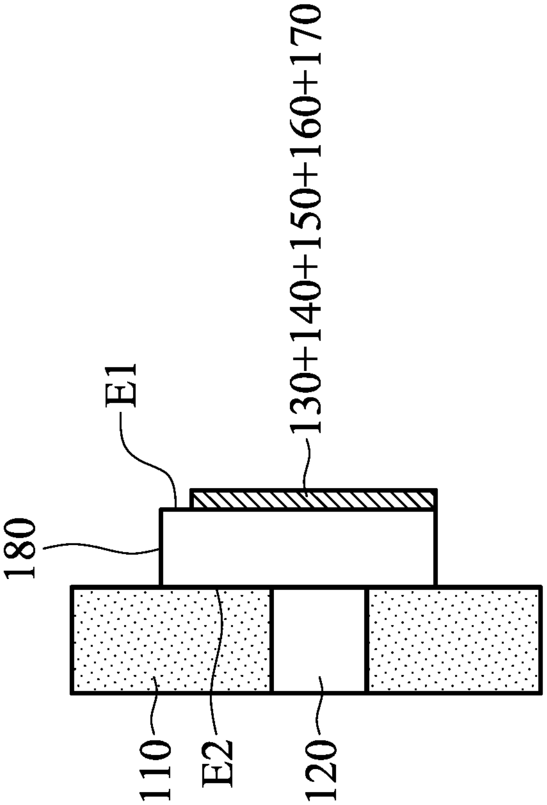
FIG. 4 is a side view of an antenna structure according to an embodiment of the invention.

FIG. 1 is a see-through view of an antenna structure 100 according to an embodiment of the invention. FIG. 2 is a partial view of a lower layer of the antenna structure 100 according to an embodiment of the invention. FIG. 3 is a partial view of an upper layer of the antenna structure 100 according to an embodiment of the invention. FIG. 4 is a side view of the antenna structure 100 according to an embodiment of the invention. Please refer to FIG. 1, FIG. 2, FIG. 3 and FIG. 4 together. The antenna structure 100 may be applied to a mobile device, such as a smart phone, a tablet computer, or a notebook computer. In the embodiment of FIG. 1, FIG. 2, FIG. 3 and FIG. 4, the antenna structure 100 includes a metal mechanism element 110, a ground element 130, a feeding radiation element 140, a connection radiation element 150, a shorting radiation element 160, a parasitic radiation element 170, and a dielectric substrate 180. The ground element 130, the feeding radiation element 140, the connection radiation element 150, the shorting radiation element 160, and the parasitic radiation element 170 may all be made of metal materials, such as copper, silver, aluminum, iron, or their alloys.

The metal mechanism element 110 has a slot 120. The slot 120 of the metal mechanism element 110 may substantially have a straight-line shape. Specifically, the slot 120 may be an open slot with an open end 121 and a closed end 122 away from each other. In some embodiments, the metal mechanism element 110 further includes a nonconductive material (not shown), which fills the slot 120 of the metal mechanism element 110, so as to achieve the waterproof or dustproof function.

The dielectric substrate 180 may be an FR4 (Flame Retardant 4) substrate, a PCB (Printed Circuit Board), or a FCB (Flexible Circuit Board). The dielectric substrate 180 has a first surface E1 and a second surface E2 which are opposite to each other. The ground element 130, the feeding radiation element 140, the connection radiation element 150, the shorting radiation element 160, and the parasitic radiation element 170 may all be disposed on the first surface E1 of the dielectric substrate 180. The second surface E2 of the dielectric substrate 180 is adjacent to the slot 120 of the metal mechanism element 120. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0). In some embodiments, the second surface E2 of the dielectric substrate 180 is directly attached to the metal mechanism element 110, such that the dielectric substrate 180 can at least partially cover the slot 120 of the metal mechanism element 110.

The ground element 130 and the metal mechanism element 110 may be coupled with each other. The shape of the ground element 130 is not limited in the invention. For example, the ground element 130 may be implemented with a ground copper foil, which may extend from the first surface E1 of the dielectric substrate 180 onto the metal mechanism element 110. In some embodiments, the ground element 130 is configured to provide a ground voltage VS S.

The feeding radiation element 140 may substantially have an L-shape. Specifically, the feeding radiation element 140 has a first end 141 and a second end 142. A feeding point FP is positioned at the first end 141 of the feeding radiation element 140. The feeding point FP may be further coupled to a signal source 190. For example, the signal source 190 may be an RF (Radio Frequency) module for exciting the antenna structure 100. In some embodiments, the feeding radiation element 140 has a first vertical projection on the metal mechanism element 110, and the first vertical projection at least partially overlaps the slot 120 of the metal mechanism element 110. It should be noted that the feeding point FP is positioned outside the slot 120 of the metal mechanism element 110. However, the invention is not limited thereto. In alternative embodiments, the feeding point FP is at one of a several possible positions on the feeding radiation element 140.

The connection radiation element 150 may substantially have a T-shape. Specifically, the connection radiation element 150 has a first end 151, a second end 152, and a third end 153. The first end 151 of the connection radiation element 150 is coupled to the second end 142 of the feeding radiation element 140. The second end 152 of the connection radiation element 150 is an open end. For example, the third end 153 and the second end 152 of the connection radiation element 150 may substantially extend in opposite directions and away from each other. In some embodiments, the connection radiation element 150 has a second vertical projection on the metal mechanism element 110, and the second vertical projection does not overlap the slot 120 of the metal mechanism element 110 at all.

The shorting radiation element 160 may substantially have a relatively long straight-line shape. Specifically, the shorting radiation element 160 has a first end 161 and a second end 162. The first end 161 of the shorting radiation element 160 is coupled to the ground element 130. The second end 162 of the shorting radiation element 160 is coupled to the third end 153 of the connection radiation element 150. That is, the connection radiation element 150 is coupled through the shorting radiation element 160 to the ground element 130. In some embodiments, the shorting radiation element 160 has a third vertical projection on the metal mechanism element 110, and the third vertical projection at least partially overlaps the slot 120 of the metal mechanism element 110. In some embodiments, a notch region 165 is defined by the feeding radiation element 140, the connection radiation element 150, and the shorting radiation element 160. The notch region 165 may substantially have a rectangular shape.

The parasitic radiation element 170 may substantially have a relatively short straight-line shape (In comparison to the shorting radiation element 160), which may be substantially parallel to the shorting radiation element 160. Specifically, the parasitic radiation element 170 has a first end 171 and a second end 172. The first end 171 of the parasitic radiation element 170 is coupled to the ground element 130. The second end 172 of the parasitic radiation element 170 is an open end, which extends into the aforementioned notch region 165. The parasitic radiation element 170 is disposed between the feeding radiation element 140 and the shorting radiation element 160. In some embodiments, the parasitic radiation element 170 is surrounded by the ground element 130, the feeding radiation element 140, the connection radiation element 150, and the shorting radiation element 160. In some embodiments, the parasitic radiation element 170 has a fourth vertical projection on the metal mechanism element, and the fourth vertical projection at least partially overlaps the slot 120 of the metal mechanism element 110.

In some embodiments, the parasitic radiation element 170 is adjacent to the feeding radiation element 140, the connection radiation element 150, and the shorting radiation element 160. A first coupling gap GC1 is formed between the parasitic radiation element 170 and the feeding radiation element 140. A second coupling gap GC2 is formed between the parasitic radiation element 170 and the shorting radiation element 160. A third coupling gap GC3 is formed between the parasitic radiation element 170 and the connection radiation element 150. For example, the width of the third coupling gap GC3 may be greater than the width of the first coupling gap GC1, and the width of the third coupling gap GC3 may also be greater than the width of the second coupling gap GC2, but they are not limited thereto.

Figure 5:
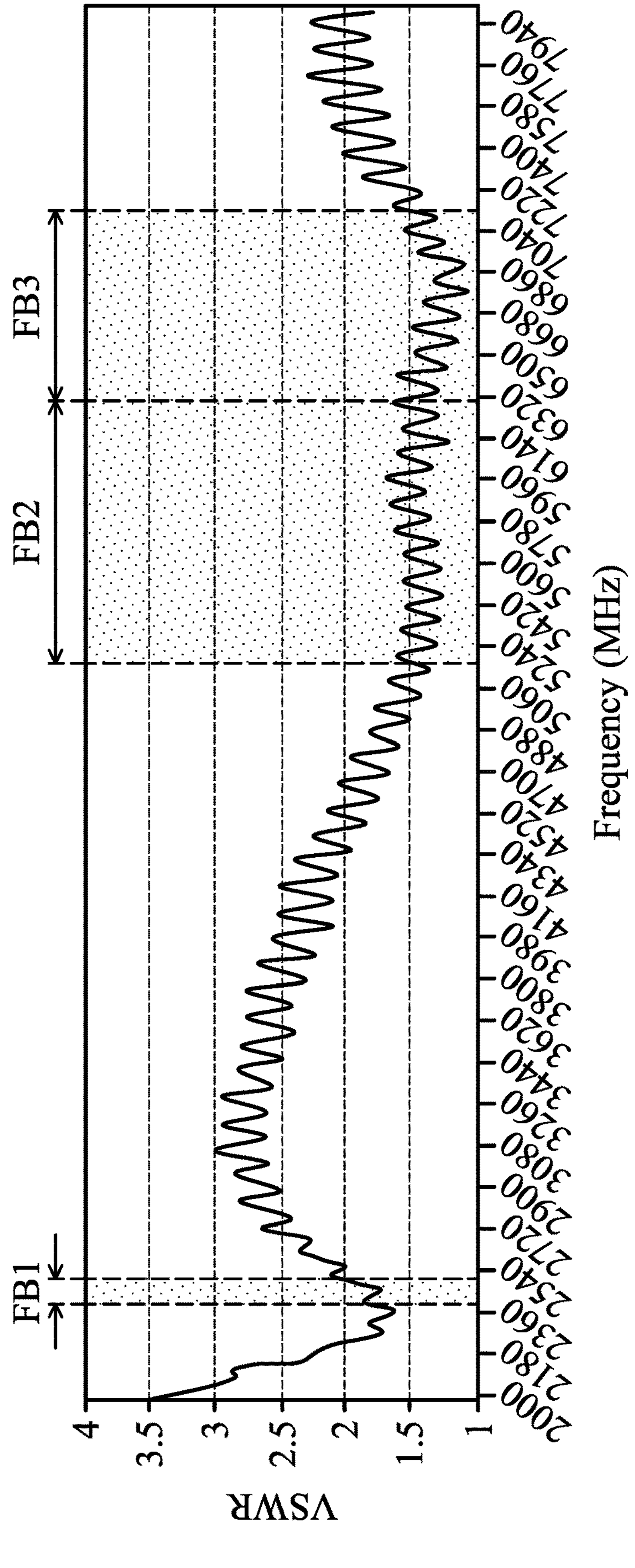
FIG. 5 is a diagram of VSWR (Voltage Standing Wave Ratio) of an antenna structure according to an embodiment of the invention.

FIG. 5 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 5, the antenna structure 100 can cover a first frequency band FB1, a second frequency band FB2, and a third frequency band FB3. For example, the first frequency band FB1 may be from 2400 MHz to 2500 MHz, the second frequency band FB2 may be from 5160 MHz to 6300 MHz, and the third frequency band FB3 may be from 6300 MHz to 7125 MHz. Therefore, the antenna structure 100 can support at least the wideband operations of the conventional WLAN (Wireless Local Area Network) and the next-generation Wi-Fi 6E.

In some embodiments, the operational principles of the antenna structure 100 will be described as follows. The slot 120 of the metal mechanism element 110 is mainly excited to generate the aforementioned first frequency band FB1. The feeding radiation element 140, the connection radiation element 150, and the shorting radiation element 160 are mainly excited to generate the aforementioned second frequency band FB2. In addition, the parasitic radiation element 170 is mainly excited to generate the aforementioned third frequency band FB3. According to practical measurements, if the feeding point FP is designed outside the slot 120 of the metal mechanism element 110, it will not only fine-tune the impedance matching of the antenna structure 100 but also improve the structural robustness and design freedom of the antenna structure 100.

In some embodiments, the element sizes of the antenna structure 100 will be described as follows. The length L1 of the slot 120 of the metal mechanism element 110 may be from 0.1 to 0.3 wavelength (0.1λ~0.3λ) of the first frequency band FB1 of the antenna structure 100. For example, the aforementioned length L1 may be from 15 mm to 22 mm. The width W1 of the slot 120 of the metal mechanism element 110 may be from 1 mm to 3 mm. The total length L2 of the feeding radiation element 140, the connection radiation element 150, and the shorting radiation element 160 may be substantially equal to 0.25 wavelength (0.25λ) of the second frequency band FB2 of the antenna structure 100. The width W2 of the shorting radiation element 160 may be from 1.5 mm to 6 mm. The length L3 of the parasitic radiation element 170 may be substantially equal to 0.25 wavelength (0.25λ) of the third frequency band FB3 of the antenna structure 100. For example, the aforementioned length L3 may be from 2 mm to 6 mm. The distance D1 between the shorting radiation element 160 and the open end 121 of the slot 120 may be from 4 mm to 6 mm. The distance D2 between the first end 141 of the feeding radiation element 140 (or the feeding point FP) and the closed end 122 of the slot 120 may be from 1 mm to 2 mm. The width of the first coupling gap GC1 may be from 0.1 mm to 0.3 mm. The width of the second coupling gap GC2 may be from 0.1 mm to 0.3 mm. The width of the third coupling gap GC3 may be from 0.25 mm to 1.25 mm. The above ranges of element sizes are calculated and obtained according to many experimental results, and they help to optimize the operational bandwidth and impedance matching of the antenna structure 100.

The invention proposes a novel antenna structure. In comparison to the conventional design, the invention has at least the advantages of smaller size, wider bandwidth, higher design freedom, and lower manufacturing cost. Therefore, the invention is suitable for application in a variety of communication devices.

Note that the above element sizes, element shapes, and frequency ranges are not limitations of the invention. An antenna designer can fine-tune these settings or values in order to meet specific requirements. It should be understood that the antenna structure and the mobile device of the invention are not limited to the configurations depicted in FIGS. 1-5. The invention may merely include any one or more features of any one or more embodiments of FIGS. 1-5. In other words, not all of the features displayed in the figures should be implemented in the antenna structure and the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a metal mechanism element, having a slot;

a ground element;

a feeding radiation element, having a feeding point;

a connection radiation element, coupled to the feeding radiation element;

a shorting radiation element, wherein the connection radiation element is coupled through the shorting radiation element to the ground element;

a parasitic radiation element, coupled to the ground element, wherein the parasitic radiation element is disposed between the feeding radiation element and the shorting radiation element; and a dielectric substrate, disposed adjacent to the slot of the metal mechanism element, wherein the feeding radiation element, the connection radiation element, the shorting radiation element, and the parasitic radiation element are disposed on the dielectric substrate.

2. The antenna structure as claimed in claim 1, wherein the slot of the metal mechanism element has an open end and a closed end.

3. The antenna structure as claimed in claim 2, wherein a distance between the shorting radiation element and the open end of the slot is from 4 mm to 6 mm.

4. The antenna structure as claimed in claim 2, wherein the feeding point is positioned outside the slot of the metal mechanism element, and a distance between one end of the feeding radiation element and the closed end of the slot is from 1 mm to 2 mm.

5. The antenna structure as claimed in claim 1, wherein the feeding radiation element substantially has an L-shape.

6. The antenna structure as claimed in claim 1, wherein the feeding radiation element has a first vertical projection on the metal mechanism element, and the first vertical projection at least partially overlaps the slot of the metal mechanism element.

7. The antenna structure as claimed in claim 1, wherein the connection radiation element substantially has a T-shape.

8. The antenna structure as claimed in claim 1, wherein the connection radiation element has a second vertical projection on the metal mechanism element, and the second vertical projection does not overlap the slot of the metal mechanism element at all.

9. The antenna structure as claimed in claim 1, wherein the shorting radiation element substantially has a relatively long straight-line shape.

10. The antenna structure as claimed in claim 1, wherein the shorting radiation element has a third vertical projection on the metal mechanism element, and the third vertical projection at least partially overlaps the slot of the metal mechanism element.

11. The antenna structure as claimed in claim 1, wherein the parasitic radiation element substantially has a relatively short straight-line shape.

12. The antenna structure as claimed in claim 1, wherein the parasitic radiation element has a fourth vertical projection on the metal mechanism element, and the fourth vertical projection at least partially overlaps the slot of the metal mechanism element.

13. The antenna structure as claimed in claim 1, wherein the parasitic radiation element is surrounded by the ground element, the feeding radiation element, the connection radiation element, and the shorting radiation element.

14. The antenna structure as claimed in claim 1, wherein a first coupling gap is formed between the parasitic radiation element and the feeding radiation element, a second coupling gap is formed between the parasitic radiation element and the shorting radiation element, and a width of each of the first coupling gap and the second coupling gap is from 0.1 mm to 0.3 mm.

15. The antenna structure as claimed in claim 1, wherein a third coupling gap is formed between the parasitic radiation element and the connection radiation element, and a width of the third coupling gap is from 0.25 mm to 1.25 mm.

16. The antenna structure as claimed in claim 1, wherein the antenna structure covers a first frequency band, a second frequency band, and a third frequency band, the first frequency band is from 2400 MHz to 2500 MHz, the second frequency band is from 5160 MHz to 6300 MHz, and the third frequency band is from 6300 MHz to 7125 MHz.

17. The antenna structure as claimed in claim 16, wherein a length of the slot is from 0.1 to 0.3 wavelength of the first frequency band.

18. The antenna structure as claimed in claim 16, wherein a total length of the feeding radiation element, the connection radiation element, and the shorting radiation element is substantially equal to 0.25 wavelength of the second frequency band.

19. The antenna structure as claimed in claim 16, wherein a length of the parasitic radiation element is substantially equal to 0.25 wavelength of the third frequency band.

20. The antenna structure as claimed in claim 1, wherein a width of the shorting radiation element is from 1.5 mm to 6 mm, and a length of the parasitic radiation element is from 2 mm to 6 mm.

* * * * *